5 Sheets—Sheet 1.

S. S. PUTNAM.
Machine for Pointing and Finishing Horse Shoe Nails.

No. 201,701. Patented March 26, 1878.

Witnesses,
W. J. Cambridge
Chas. E. Griffen

Inventor,
Silas S. Putnam,
Per Teschemacher & Stearns,
Attorneys.

5 Sheets—Sheet 2.

S. S. PUTNAM.
Machine for Pointing and Finishing Horse Shoe Nails.

No. 201,701. Patented March 26, 1878.

5 Sheets—Sheet 3.
S. S. PUTNAM.
Machine for Pointing and Finishing Horse Shoe Nails.
No. 201,701. Patented March 26, 1878.
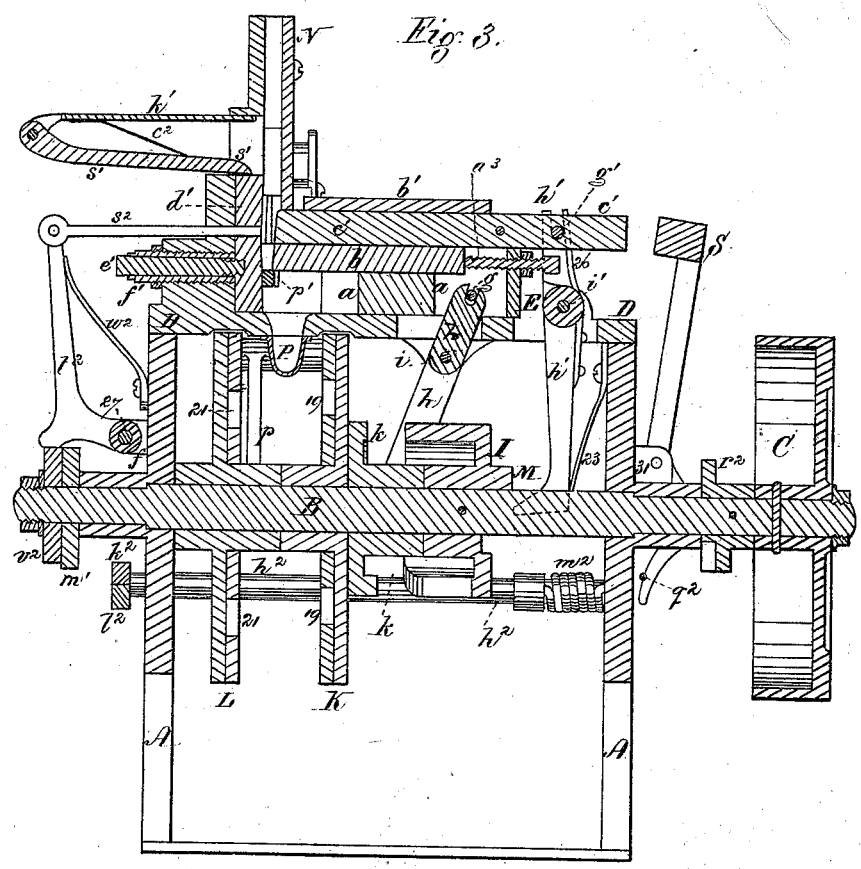
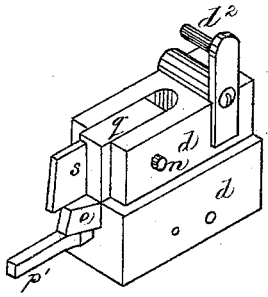
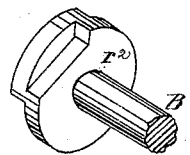
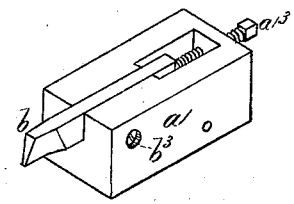
Witnesses,
W. J. Cambridge
Chas. E. Griffin
Inventor,
Silas S. Putnam,
Per Teschemacher & Stearns,
Attorneys.

S. S. PUTNAM.
Machine for Pointing and Finishing Horse Shoe Nails.
No. 201,701. Patented March 26, 1878.
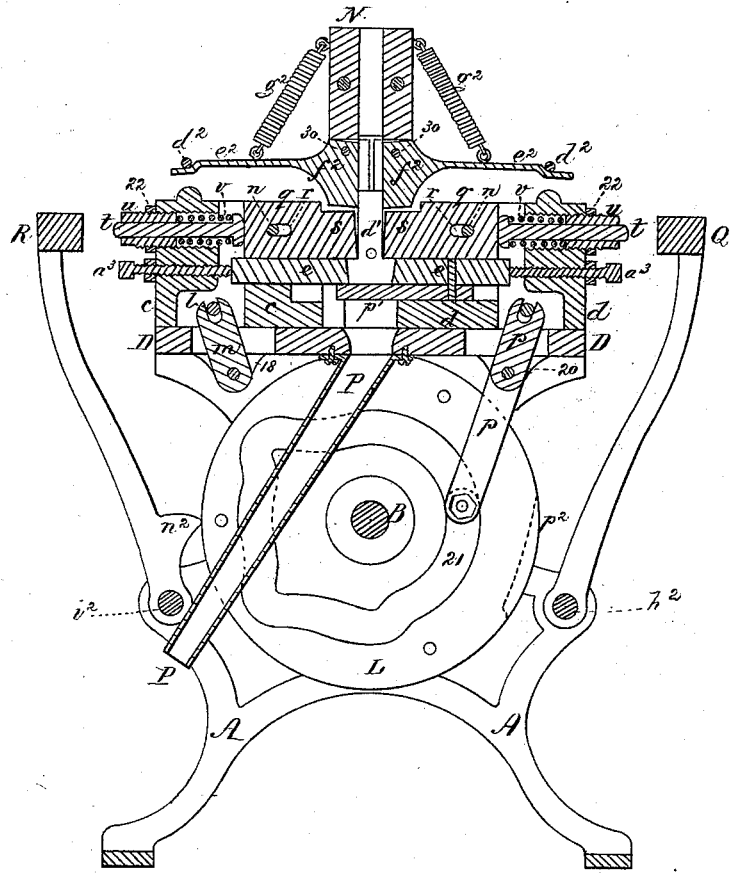
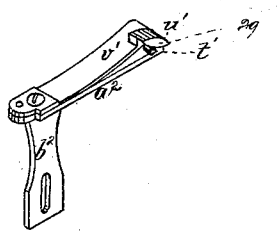
Fig. 12.

S. S. PUTNAM.
Machine for Pointing and Finishing Horse Shoe Nails.

No. 201,701. Patented March 26, 1878.

UNITED STATES PATENT OFFICE.

SILAS S. PUTNAM, OF BOSTON, MASSACHUSETTS, ASSIGNOR TO THE PUTNAM NAIL COMPANY, OF SAME PLACE.

IMPROVEMENT IN MACHINES FOR POINTING AND FINISHING HORSESHOE-NAILS.

Specification forming part of Letters Patent No. 201,701, dated March 26, 1878; application filed November 1, 1877.

*To all whom it may concern:*

Be it known that I, SILAS S. PUTNAM, of Boston, in the county of Suffolk and State of Massachusetts, have invented certain Improvements in Machines for Pointing and Finishing Forged Horseshoe-Nails, of which the following is a full, clear, and exact description, reference being had to the accompanying drawings, making part of this specification, in which—

Figure 1:
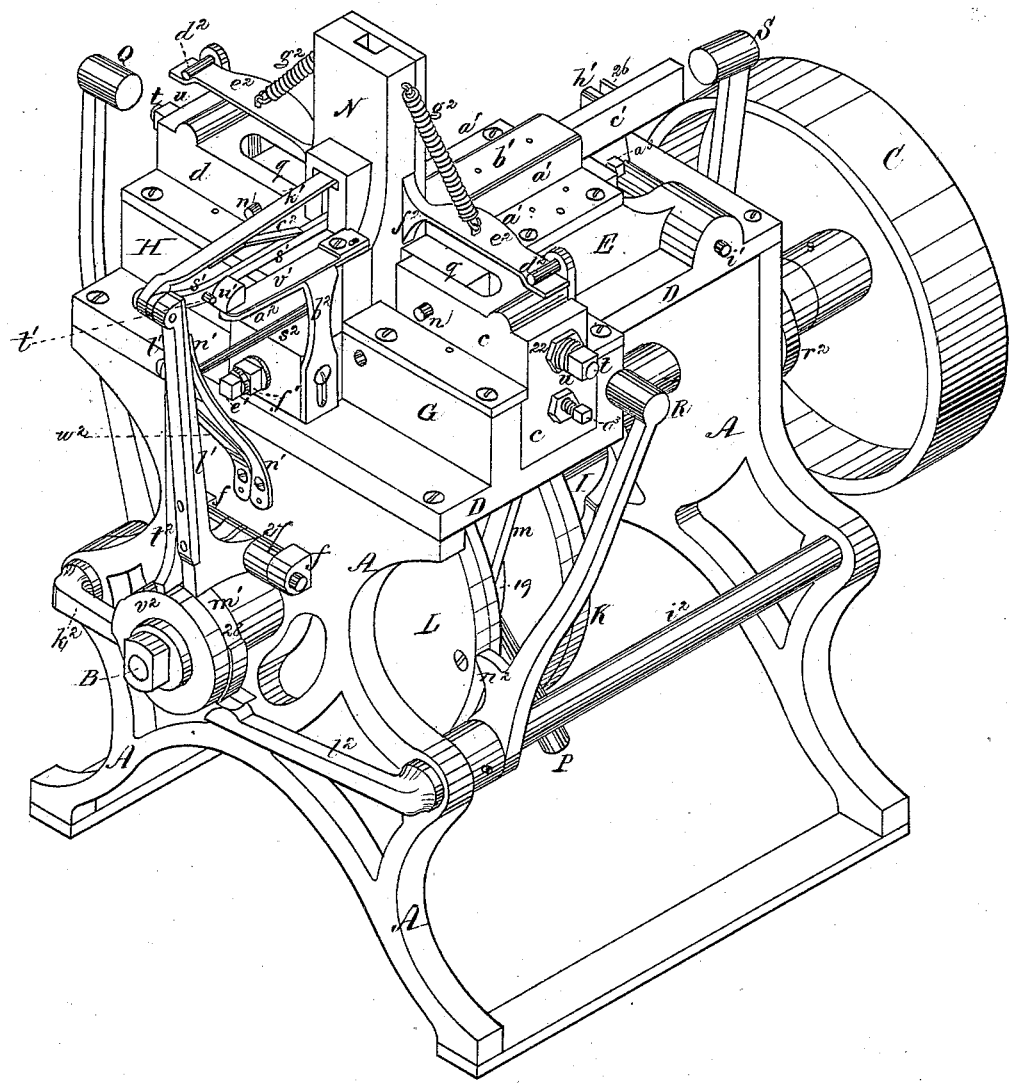
Figure 2:
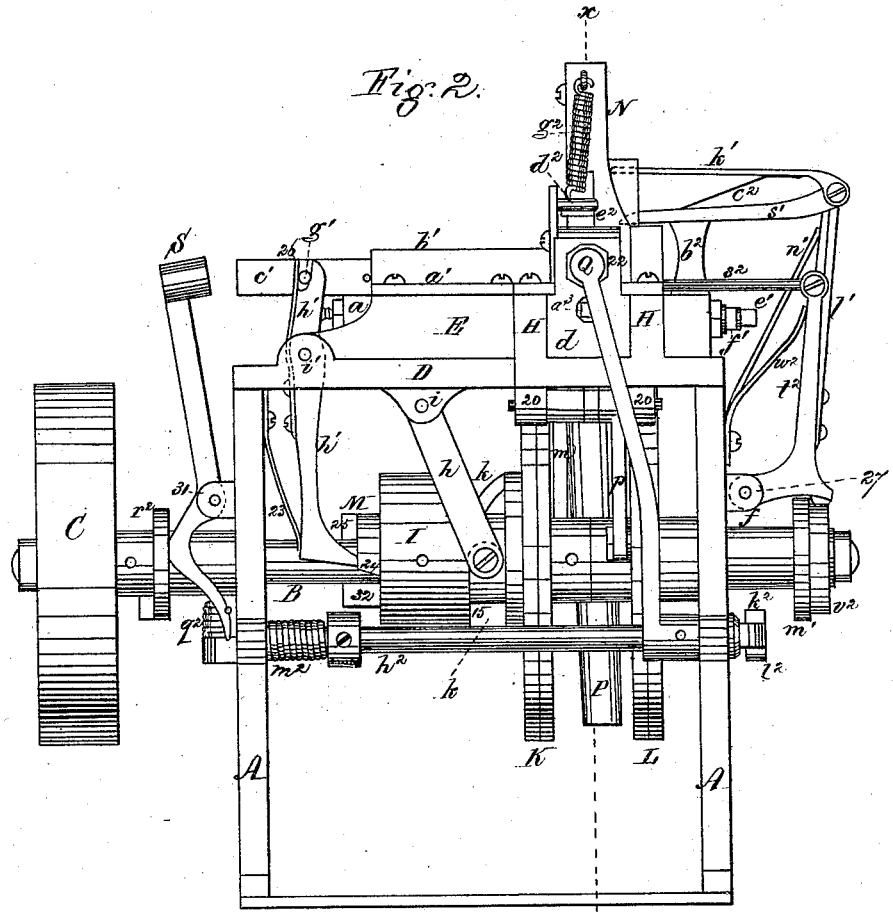
Figure 5:
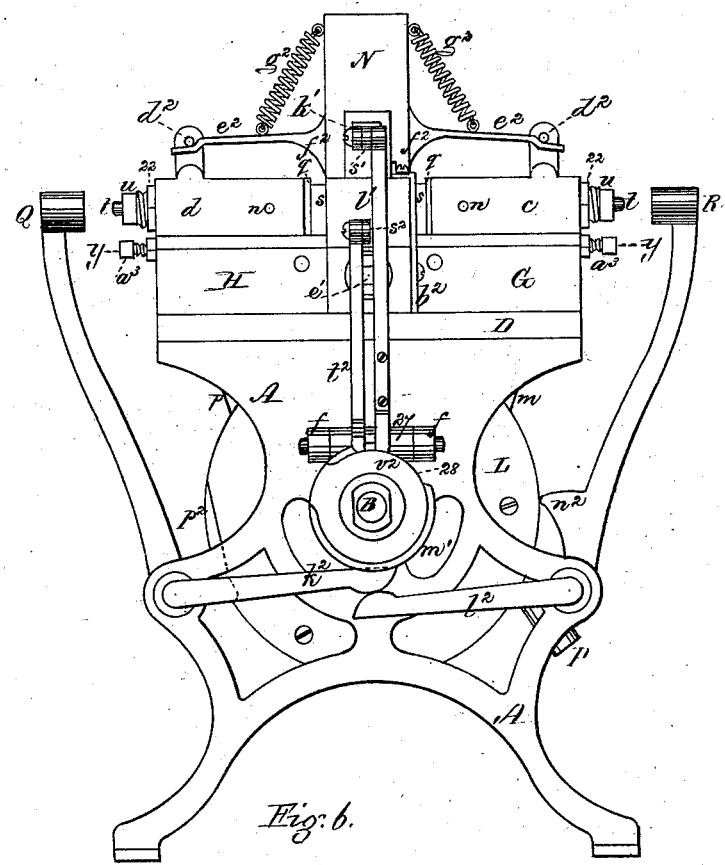
Figure 6:
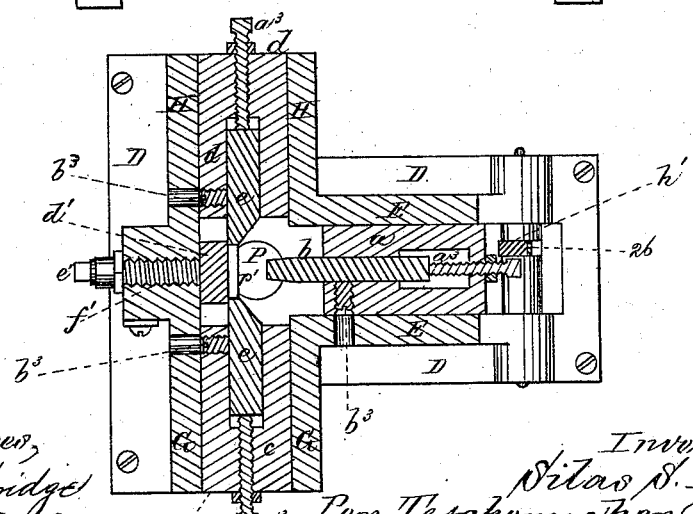

Figure 1 is a perspective view of my improved machine. Fig. 2 is a side elevation of the same. Fig. 3 is a longitudinal vertical section through the center of the same. Fig. 4 is a transverse vertical section through the same on the line $x\ x$ of Fig. 2. Fig. 5 is a front elevation of the machine. Fig. 6 is a horizontal section on the line $y\ y$ of Fig. 5; Figs. 7, 8, 9, 10, 11, and 12, details.

My present invention relates to a machine for pointing and finishing forged horseshoe-nails, in which the nail is griped and held firmly while being acted upon by a series of dies, which straighten it if crooked, and finish the blade and point, at the same time condensing and hardening the metal and rendering the nail stiff and fit for driving; and my invention consists in certain details of construction, to be hereinafter particularly set forth.

To enable others skilled in the art to understand and use my invention, I will proceed to describe the manner in which I have carried it out.

In the said drawings, A represents the frame-work of the machine, in suitable bearings, in which runs the driving-shaft B, to which are secured the driving-pulley C and a series of cam-wheels, to be hereinafter described.

D is the bed of the machine, which is supported on the frame-work A, and is provided on its upper side with a central longitudinal way, E, and transverse ways G H at right angles thereto, these ways being arranged in the form of a cross, the way E serving as a guide for the horizontally-sliding block $a$, to which the front die $b$, Fig. 3, is attached, and the ways G H as guides for the horizontally-sliding blocks $c\ d$, which carry the side dies $e\ e$.

Figure 7:
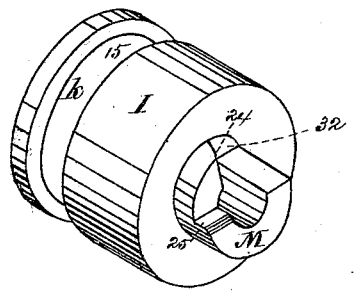
Figure 8:
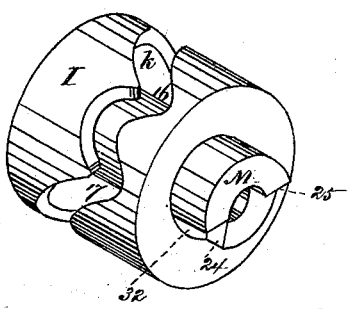

The block $a$ is provided with a rectangular aperture, across which extends a pin, $g$, with which engages the upper bifurcated end of a lever, $h^1$, which is pivoted at $i$ between two lugs projecting from the under side of the bed D, and carries at its lower end a friction-roll, (seen dotted in Fig. 2,) which projects into a cam-groove, $k$, formed in the periphery of a wheel, I, secured to the driving-shaft B, this cam-groove having a straight portion, 15, and two curved portions, 16 17, as seen in Figs. 7 and 8, by means of which the desired movements are imparted to the die $b$, as will be more particularly described hereinafter.

The sliding block $c$ is provided on its under side with a recess, across which extends a pin, $l$, with which engages the bifurcated end of a lever, $m$, pivoted between lugs 18 on the under side of the bed D, and carrying at its lower end a friction-roll, which fits within a cam-groove, 19, in the side of a wheel, K, secured to the shaft B, the form of the groove being such as to cause the slide to advance and recede at the proper times, as will be hereinafter described.

The sliding block $d$ is constructed and operated in precisely the same manner as the block $c$, and is actuated simultaneously therewith by a lever, $p$, similar to the lever $m$, and pivoted between lugs 20, the lower end of the lever $p$ carrying a friction-roll which fits into a cam-groove, 21, in the side of a wheel, L, similar to the wheel K, and secured to the driving-shaft B a short distance therefrom, the two cam-grooves 19 21 being of precisely the same form, in order that the movements of the slides $c\ d$ may be exactly alike.

Within a narrow recess in each of the blocks $c\ d$ is fitted a slide, $q$, which rests directly upon the die $e$, and is held in place by a pin, $n$, passing through a slot, $r$, and from the inner ends of these slides $q$ project the straightening-dies $s\ s$, which act upon the sides of the nail, and straighten it if crooked, these dies having their faces slightly inclined to correspond to the taper of the nail, and projecting out in advance of the dies $e\ e$ when the blocks $c\ d$ are drawn back, as seen in Fig. 4.

Against the end of each of the slides $q$ bears a pin, $t$, which projects out and slides through a hollow screw, $u$, the pin being caused to exert a pressure upon the slide $q$ by means of a spiral spring, $v$, surrounding the pin, and confined in place by the hollow screw $u$, by turning which the pressure upon the slide can be increased or diminished, and the force with which the dies $s\ s$ act upon the nail can thus be regulated, as desired, and the springs thus caused to bear with equal force, whereby the nail is kept in its proper central position and perfectly straightened. Each of the hollow screws $u$ is provided with a check-nut, 22, to hold it in place when adjusted.

The covering-plate $a^1$ of the way E is provided with a longitudinal projection, $b^1$, through which slides a horizontal bar, $c^1$, which forms a clamp or binder for retaining the nail against a stationary die, $d^1$, which is secured to a solid projecting portion of the bed D by means of a binding-screw, $e^1$, passing through a hollow screw, $f^1$, the latter abutting against the die, and by means of this screw $f^1$ the die can be adjusted to compensate for wear, the binding-screw $e^1$ holding it firmly in place when adjusted. The face of this die $d^1$ is made slightly hollow, in order to give the desired curve to the nail when finished.

The clamping-bar $c^1$ has its front end slightly inclined to correspond to the taper of the portion of the blade of the nail with which it comes into contact, and from one side of this bar projects a pin, $g^1$, with which engages the upper bifurcated extremity of a lever, $h^1$, pivoted on a pin, $i^1$, between two lugs projecting from the upper surface of the bed D. The foot or lower end of the lever $h^1$ is kept by a flat spring, 23, against a cam, M, at one end of the cam-wheel I, the cam M being constructed with two inclines or projections, 24 25, and being so formed as to cause the clamping-bar (through the lever $h^1$) to advance and recede to clamp and release the nail at the required times.

One of the bifurcations at the upper end of the lever $h^1$ consists of a spring, 26, which bears against the pin $g^1$ when the bar $c^1$ is to be advanced, causing it to exert a spring-pressure upon the nail and adapting it to clamp nails of varying thicknesses.

N is an upright conductor, into which the nails to be pointed and finished are dropped, one at a time, with the head uppermost and the inclined side thereof toward the front die $b$, the nail being arrested by its point striking a movable slide or stop, $k^1$, pivoted at its outer end to the upper extremity of a lever, $l^1$, the lower bent end or foot of which is pivoted at 27 between two lugs, $f$, projecting from the side of the frame-work. The outer end of the foot of the lever $l^1$ rests upon a cam-wheel, $m^1$, secured to the shaft B, and when the notched portion 28 of this cam-wheel arrives beneath the foot of the lever the upright arm thereof is thrown out by a spring, $n^1$, and the end of the stop is withdrawn from the conductor. As soon as this takes place the nail drops, by its own weight, to the bottom of the conductor, where it is arrested by its point striking another stop, $p^1$, which is attached to and projects out from one of the dies $e$, as seen in Fig. 4, the upper surfaces of the stop $p^1$ being on a level with the under surface of the dies $e\ e$, whereby the point of the nail is prevented from getting below the dies, while the forward movements of the latter are not interfered with by the stop.

When the straightening-dies $s\ s$ are drawn back to their full extent their faces form a portion of the inner sides of the conductor, and are in line therewith, their position being determined by the pins $n$ and slots $r$, which limit the distance which they are pushed forward by the springs behind them. Just previous to the withdrawal of the stop $k^1$ the incline 24 of the cam M strikes the foot of the lever $h^1$ and advances the clamping-bar $c^1$, so that its face will form a continuation of the inside of the conductor in line therewith, whereby the nail is prevented from accidentally passing the lower stop $p^1$ and falling into the discharge-spout P, the mouth of which is located immediately beneath the conductor N.

Almost immediately after the withdrawal of the stop $k^1$ it is advanced to its original position by the action of the cam $m^1$, which moves the lever $l^1$ inward against the resistance of its spring $n^1$, in order to arrest the next nail which is dropped into the conductor, and simultaneously with this movement of the stop $k^1$ an arm or finger, $s^1$, enters the conductor over the nail just released, and follows it down, which prevents it from rebounding, and insures the nail being down in its proper position when griped by the clamping-bar $c^1$; and by means of this device the nail is prevented from being imperfectly formed or spoiled, as would be the case if it should be caught on the rebound by the clamping-bar.

The finger $s^1$ is pivoted at its outer end to the lever $l^1$, and is operated in the following manner: From the side of the finger $s^1$ projects a pin, $t^1$, which, when the finger is advanced by the forward movement of the lever $l^1$, strikes an inclined or curved projection, $w'$, formed at the end of a light spring, $v^1$, which lies flat upon the upper surface of a plate, $a^2$, to which it is attached at its inner end by a screw passing through a slot, which allows of its horizontal adjustment. The plate $a^2$ is supported by an arm, $b^2$, secured to the bed D by a screw passing through a slot, which admits of its vertical adjustment. As the finger advances it is raised by the pin $t^1$ riding up over the inclined projection $w'$, and after being so raised its extremity passes into the interior of the conductor over the head of the nail just dropped. Just before the termination of the forward movement of the finger the pin $t^1$ is advanced beyond the inclined projection $w'$, when a flat spring, $c^2$, attached to the sliding stop $k^1$, instantly depresses the finger $s^1$, causing it to follow the nail down, as before mentioned, the end of the finger remaining within the conductor until it is withdrawn by the backward movement of the lever $l^1$, which simultaneously withdraws the upper stop $k^1$. On the backward movement of the finger its pin $t^1$ passes under a curved lip, 29, Fig. 12, on one side of the projection $w'$, raising the latter against the resistance of the spring $v^1$, and as soon as the pin $t^1$ has passed out from beneath the lip 29, the projection $w'$ is returned to its original position, and the pin is ready to again ride up over it on the advance of the finger, as before described.

The lever $l^1$ is formed of two portions, the outer one, to which the stop $k^1$ and finger $s^1$ are attached, consisting of a spring which will yield in case the end of the finger should accidentally come into contact with a nail in the conductor, thus avoiding breakage or injury of the parts, this contact of the finger with a nail being liable to occur if the nail should from any cause stick within the conductor.

Immediately after the completion of the forward and downward movement of the finger $s^1$ the incline 25 of the cam M strikes the foot of the lever $h^1$, and advances the clamping-bar $c^1$, causing it to gripe the nail at or near the middle of its blade and clamp it against the stationary die $d^1$, which forms a portion of the front side of the interior of the conductor. The slides $c$ $d$ are now moved forward, and the dies $s$ $s$ brought into contact with the side of the nail, whereby it is straightened if crooked, these dies acting upon the sides of the nail from the shoulder under the head down to near the point, and yielding against the resistance of their springs $v$ as the slides $c$ $d$ continue to advance, thus exerting a spring pressure upon the nail.

During the first part of the movement of the slides $c$ $d$, and just before the dies $s$ $s$ come into contact with the nail, a pin, $d^2$, projecting horizontally from an upright arm on each slide, strikes an incline on the spring-arm $e^2$ of a griping-lever, $f^2$, pivoted at 30, the inner faces of these griping-levers being in line with the inner sides of the conductor; and as the arms $e^2$ are depressed by the pins $d^2$ against the resistance of springs $g^2$, the levers $f^2$ seize and hold the nail firmly by the head in a central position, the spring-arms $e^2$ causing the head of the nail to be griped with a yielding pressure, as is necessary owing to the varying sizes of the heads of the nails passing through the conductor. The lower side dies $e$ $e$ now strike the sides of the nail and compress its point, in order to give it the desired shape and finish. A light blow is then struck upon the outer projecting end of each of the pins $t$ by hammers Q R, the force of the blows being transmitted, through the pins $t$, slides $q$, and dies $s$, to the nail, whereby the metal is set, and the tendency of the nail to spring when released by the dies prevented.

The arms of these hammers Q R are attached to rock-shafts $h^2$ $i^2$, having their bearings in the frame-work, these shafts being provided with levers $k^2$ $l^2$, the end of the former overlapping the end of the latter, as seen in Fig. 5, so that when the hammer Q is thrown forward to give a blow by the action of a spring, $m^2$, coiled around the shaft $h^2$, its motion will be communicated to the opposite hammer R, causing both hammers to strike at the same instant, as is necessary to keep the nail in its proper central position.

The arm of the hammer R is provided with a projection, $n^2$, which bears upon the periphery of the wheel L, thus keeping the hammers drawn back against the resistance of the spring $m^2$, as seen in Fig. 4, until a notch, $p^2$, Fig. 5, and dotted in Fig. 4, in the wheel L arrives opposite the projection, when the hammers are released and thrown forward against the outer ends of the pins $t$, as before described.

As the wheel L continues to revolve, the inclined face of the notch $p^2$ acts upon the projection $n^2$, drawing back the hammers, which remain in this position until the notch $p^2$ is again brought round opposite to the projection $n^2$.

After the hammers Q R have struck their blows and have been retracted, the slides $c$ $d$ recede a short distance, carrying with them the dies $e$ $e$, (the straightening-dies $s$ $s$ remaining stationary,) and the front die $b$ then advances and strikes the nail, forming the scarf or front beveled side of the point, after which the die $b$ is withdrawn a short distance by the backward movement of the slide $a$, when the lower side dies $e$ $e$ are again advanced, and after acting upon the nail, as before, recede, when the die $b$ advances and strikes the nail a second time, immediately after which a light blow is struck by a hammer, S, upon the outer end of the clamping-bar $c^1$, in order to set the metal and cause the nail to retain its shape.

The arm or lever of the hammer S is pivoted between lugs 31 on the side of the frame-work, and is drawn back against the resistance of a spring, $q^2$, by a cam-wheel, $r^2$, on the shaft B, the spring acting upon the arm when released, and causing the hammer to give a blow, as desired.

The slide $a$ and front die $b$ are now retracted, and the hammer S simultaneously drawn back, and, as soon as this hammer has been partially drawn back, a deep notch, 32, in the cam M arrives opposite the foot of the lever $h^1$, which is instantly forced therein by the action of the spring 23, by which means the lever $h^1$ is vibrated, and the clamping-bar $c^1$ suddenly withdrawn to release the nail from its gripe.

Soon after the front die $b$ commences to recede for the last time the side slides $c$ $d$ commence to move back, and are then retracted to their full extent, carrying with them the dies $e$ $e$ and straightening-dies $s$ $s$, the latter part of this movement carrying the pins $d^2$ past the inclines of the spring-arms $e^2$, when the griping-levers $f^2$ will be moved by their springs $g^2$, so as to release the head of the nail, which is at the same instant pushed off the lower stop $p^1$ into the discharge-spout P by a push-rod, $s^2$, which enters the conductor through an aperture in the die $d^1$, the space between the dies $s$ $s$ when drawn back, and the distance of the front die $b$ from the stationary die $d^1$ when retracted for the last time, being sufficient to allow of the passage of the head of the nail.

The outer end of this rod $s^2$ is pivoted to a lever, $t^2$, the lower bent end or foot of which is pivoted between the lugs $f$ on the front of the frame-work, the outer end of this foot bearing upon a cam-wheel, $v^2$, on the shaft B, with which it is kept in contact by a flat spring, $w^2$, and by means of this cam-wheel and spring the rod $s^2$ is advanced and withdrawn at the required times.

The slides $q$ have a slight play within their recesses, which construction allows them to adjust themselves to nails having differently-tapered sides, and the lower side dies $e\ e$ and the front die $b$ are each adjusted by a set-screw, $a^3$, by which they can be centered and their faces brought into the exact position desired, each die being held when adjusted by a set-screw, $b^3$.

The movements of the side dies are so timed with respect to those of the front die as to avoid any interference, and a nail is pointed and finished and discharged from the spout at each complete revolution of the driving-shaft B, the point of the nail being reduced in thickness and width and slightly elongated, which operation serves to condense, smooth, and harden the iron, so as to render the nail stiff and fit for driving, thus avoiding the necessity of hammering it upon an anvil previous to use, as has heretofore been customary among blacksmiths.

What I claim as my invention, and desire to secure by Letters Patent, is—

1. The yielding straightening-dies $s\ s$, lower side dies $e\ e$, front die $b$, and stationary die $d^1$, in combination with the conductor N, and one or more clamping devices for holding the nail while being acted upon by the dies, substantially as and for the purpose set forth.

2. The griping-levers $f^2$, with their spring-arms $e^2$, arranged upon opposite sides of the conductor N, in combination with the dies $s\ s$, $e\ e$, $b$, and $d^1$, operating substantially in the manner and for the purpose described.

3. The finger $s^1$, having both a vertical and horizontal travel, in combination with the conductor N and stop $p$, operating substantially as described, for the purpose specified.

4. The combination of the finger $s^1$ with the yielding spring-lever $l^1$, substantially as and for the purpose described.

5. The combination of the lever $l^1$, finger $s^1$, pin $t^1$, spring $v^1$, with its projection $u'$, having a lip, 29, and the springs $n^1$ and $c^2$, all constructed to operate substantially as described.

6. The straightening-dies $s\ s$, with their slides $q$ arranged to move horizontally in the blocks $c\ d$, in combination with the independent pins $t$, springs $v$, and hollow screws $u$, for adjusting the pressure of the springs, substantially as described.

7. The horizontally-sliding blocks $c\ d$, the cams K L, and levers $m\ p$, in combination with the dies $s\ s$ and $e\ e$, as set forth.

Witness my hand this 27th day of October, A. D. 1877.

SILAS S. PUTNAM.

In presence of—
P. E. TESCHEMACHER,
N. W. STEARNS.